United States Patent
Morris et al.

(10) Patent No.: US 9,295,933 B2
(45) Date of Patent: Mar. 29, 2016

(54) FILTER ELEMENT AND FILTER ASSEMBLY HAVING TWO FILTRATION ZONES

(71) Applicant: CATERPILLAR INC., Peoria, IL (US)

(72) Inventors: Bryant A. Morris, Peoria, IL (US); Vincent P. Caliendo, Peoria, IL (US); Philip C. Spengler, Washington, IL (US); Jeffrey R. Ries, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 96 days.

(21) Appl. No.: 14/310,524

(22) Filed: Jun. 20, 2014

(65) Prior Publication Data

US 2015/0369496 A1    Dec. 24, 2015

(51) Int. Cl.
*B01D 46/00* (2006.01)
*F24F 3/16* (2006.01)
*B01D 46/52* (2006.01)
*B01D 46/24* (2006.01)

(52) U.S. Cl.
CPC .......... *B01D 46/002* (2013.01); *B01D 46/0005* (2013.01); *B01D 46/0019* (2013.01); *B01D 46/2411* (2013.01); *B01D 46/521* (2013.01); *F24F 3/1603* (2013.01)

(58) Field of Classification Search
CPC ........... B01D 46/0005; B01D 46/0019; B01D 46/002; B01D 46/2411; B01D 46/521; B01D 29/15; B01D 29/21; B01D 29/33; B01D 29/333; B01D 29/52; F24F 3/1603; F24F 2003/1614
See application file for complete search history.

(56) References Cited

U.S. PATENT DOCUMENTS

| 4,120,527 A | 10/1978 | Lawrence | |
|---|---|---|---|
| 5,391,112 A | 2/1995 | Wardlaw | |
| 5,879,230 A | 3/1999 | Wardlaw et al. | |
| 5,968,215 A | 10/1999 | Webb | |
| 2012/0214394 A1 | 8/2012 | Kanemaru et al. | |
| 2015/0182886 A1* | 7/2015 | Morris | B01D 29/58 210/323.2 |
| 2015/0209698 A1* | 7/2015 | Morris | B01D 29/13 210/436 |
| 2015/0209699 A1* | 7/2015 | Morris | B01D 29/13 210/437 |
| 2015/0209704 A1* | 7/2015 | Morris | B01D 29/13 210/437 |
| 2015/0209705 A1* | 7/2015 | Morris | B01D 35/005 210/232 |
| 2015/0265953 A1* | 9/2015 | Morris | B01D 35/027 210/136 |

FOREIGN PATENT DOCUMENTS

DE    34 05 140 A1    8/1985
EP    2 634 023 A1    9/2013

* cited by examiner

*Primary Examiner* — Robert Clemente
(74) *Attorney, Agent, or Firm* — Finnegan, Henderson, Farabow, Garrett & Dunner, LLP

(57) ABSTRACT

A filter element may include filter media having an elongated hollow passage extending along a longitudinal axis and between a first end and a second end, with the filter media having an exterior surface. The filter element may also include first and second fins associated with and extending radially from the exterior surface of the filter media. The filter media may include a first filtration zone extending partially around the hollow passage and between the first fin and the second fin, with the first filtration zone being associated with a first portion of the filter media. The filter media may also include a second filtration zone extending partially around the hollow passage and between the first fin and the second fin, with the second filtration zone being associated with a second portion of the filter media.

20 Claims, 3 Drawing Sheets

FILTER ELEMENT AND FILTER ASSEMBLY HAVING TWO FILTRATION ZONES

TECHNICAL FIELD

The present disclosure relates to a filter element and filter assembly, and more particularly, to a filter element and a filter assembly having at least two filtration zones.

BACKGROUND

Many machines include an enclosed cab to protect the operator and provide a more comfortable environment in which to operate the machine. Such cabs may include a heating, ventilating, and air conditioning (HVAC) system to control the temperature and/or humidity inside the cab. Such HVAC systems may both draw air into the cab from exterior to the cab, and recirculate air within the cab for additional adjustment of the temperature or humidity of the air inside the cab. In order to remove particles from the air entering the cab, a filter may be provided, through which air drawn into the cab by the HVAC system may be filtered. In addition, particles may be removed from air recirculated inside the cab by another filter.

However, having separate filter assemblies and associated ducting for air drawn into the cab and air recirculated within the cab may occupy more space than desired, potentially resulting in insufficient space for other desired features inside the cab. In addition, it may be desirable to reduce the number of parts in the machine to reduce manufacturing and maintenance costs, including costs associated with machine downtime for servicing multiple filters.

An example of an HVAC system that includes a filter for filtering fresh air from outside a vehicle as well as air recirculated inside the vehicle is described in U.S. Patent Application Publication No. US 2012/0214394 A1 to Kanemaru et al. ("the '394 publication"). According to the '394 publication, a housing defines an exterior fresh air intake aperture and an interior recirculation air intake aperture. A suction passage is in communication with both the exterior and interior air intake apertures. A first door is operably associated with the exterior air intake aperture for selectively opening and closing the exterior air intake aperture. A second door operably associated with the interior air intake aperture selectively opens and closes the interior air intake aperture. The first and second doors are movable independent of each other, and a partition for at least partially dividing the suction passage is located upstream of a filter in the suction passage. In a mixture mode, the first door is configured to control ram pressure as vehicle speed increases to maintain a predetermined airflow ratio between fresh air flowing into the housing via the exterior air intake aperture and recirculation air flowing into the housing via the interior air intake aperture.

Although the HVAC system disclosed in the '394 publication includes a partition upstream of a filter, the system is complex and relies on a pair of movable doors and the partition to direct air to a planar filter. Thus, the system described in the '394 publication may occupy more space than desired and requires a relatively complex arrangement including a large number of parts resulting in elevated manufacturing and maintenance costs.

The filter element and filter assembly disclosed herein may be directed to mitigating or overcoming one or more of the possible drawbacks set forth above.

SUMMARY

According to a first aspect, the present disclosure is directed to a filter element. The filter element may include filter media having an elongated hollow passage extending along a longitudinal axis and between a first end and a second end, with the filter media having an exterior surface. The filter element may also include a first fin associated with and extending radially from the exterior surface of the filter media, with the first fin extending longitudinally at least partially between the first end and the second end of the filter media. The filter element may further include a second fin associated with and extending radially from the exterior surface of the filter media, with the second fin extending longitudinally at least partially between the first end and the second end of the filter media. The filter media may include a first filtration zone extending partially around the hollow passage and between the first fin and the second fin, with the first filtration zone being associated with a first portion of the filter media. The filter media may also include a second filtration zone extending partially around the hollow passage and between the first fin and the second fin, with the second filtration zone being associated with a second portion of the filter media.

According to a further aspect, the disclosure is directed to a filter assembly. The filter assembly may include a housing configured to be coupled to an intake duct and a recirculation duct, and a filter element received in the housing. The filter element may include filter media having an elongated hollow passage extending along a longitudinal axis and extending between a first end and a second end, with the filter media having an exterior surface. The filter element may also include a first fin associated with and extending radially from the exterior surface of the filter media, with the first fin extending longitudinally at least partially between the first end and the second end of the filter media. The filter element may further include a second fin associated with and extending radially from the exterior surface of the filter media, with the second fin extending longitudinally at least partially between the first end and the second end of the filter media. The filter media may include a first filtration zone extending partially around the hollow passage and between the first fin and the second fin, with the first filtration zone being associated with a first portion of the filter media. The filter media may also include a second filtration zone extending partially around the hollow passage and between the first fin and the second fin, with the second filtration zone being associated with a second portion of the filter media. The first filtration zone may be configured to filter air received from the intake duct, and the second filtration zone may be configured to filter air received from the recirculation duct.

DETAILED DESCRIPTION

Figure 1:
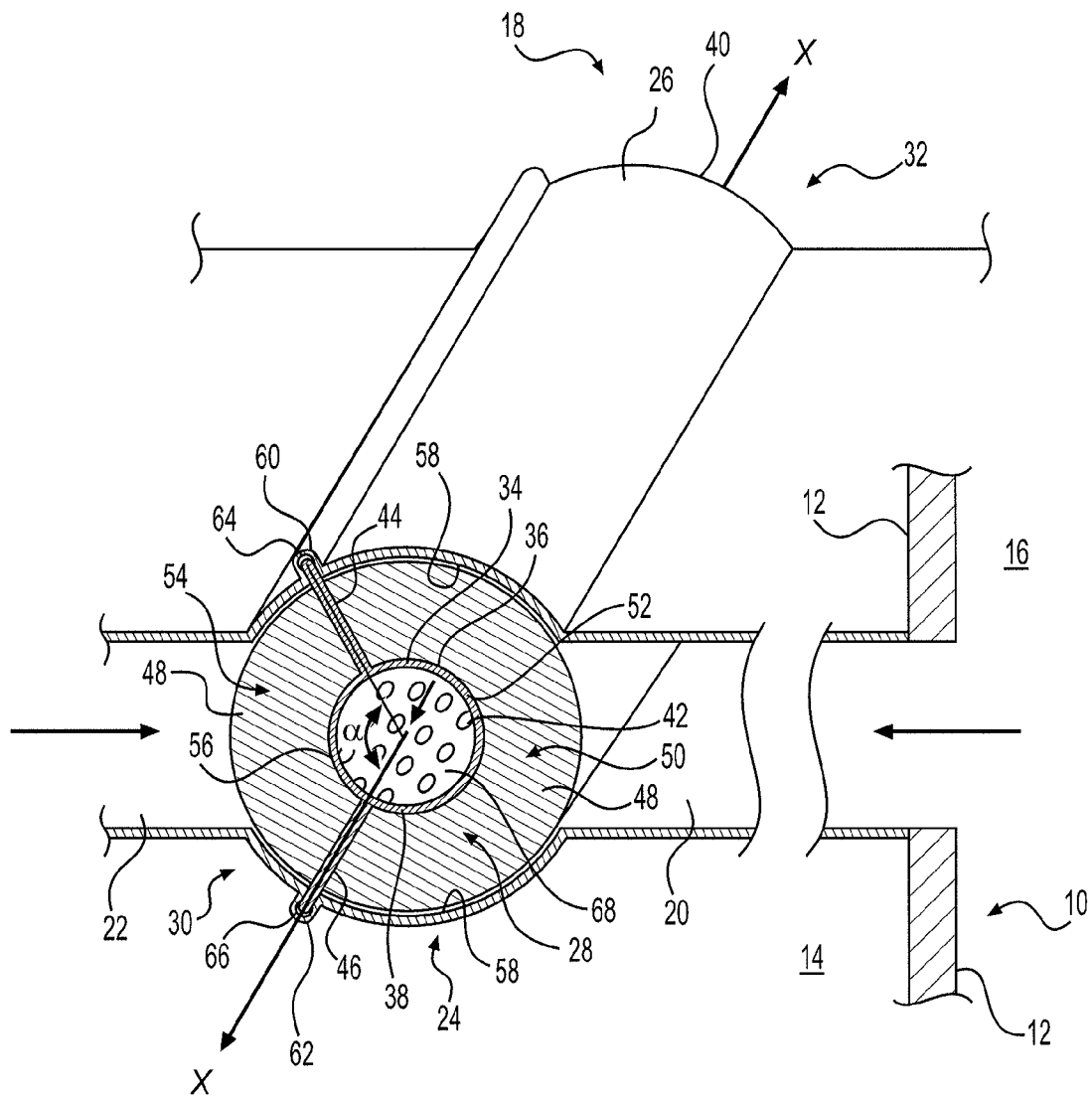
FIG. 1 is a schematic, partial section view of an exemplary embodiment of a filter assembly including an exemplary embodiment of a filter element.

The exemplary filter element and filter assembly disclosed herein may have applications in machines, such as an automobile, truck, agricultural vehicle, wheel loader, dozer, loader, track-type tractor, grader, off-highway truck, or any other machines known to those skilled in the art. As shown in FIG. 1, such a machine may include a cab 10 defined by at least one wall 12 separating an interior 14 of cab 10 from surroundings 16 exterior to cab 10. Exemplary cab 10 includes a heating, ventilating, and air conditioning (HVAC) system 18 (partially shown in FIG. 1) configured to control the temperature and/or humidity inside cab 10. Exemplary HVAC system 18 is configured to both draw air into cab 10 from surroundings 16 into interior 14 of cab 10, and recirculate air within cab 10 for additional adjustment of the temperature or humidity of the air inside cab 10.

In the exemplary embodiment shown in FIG. 1, HVAC system 18 includes an intake duct 20, a recirculation duct 22, and a filter assembly 24. Exemplary intake duct 20 provides an air path from surroundings 16 to interior 14 of cab 10, and exemplary recirculation duct 22 provides an air path from interior 14 of cab 10 for recirculation of air inside cab 10. Exemplary filter assembly 24 includes a filter housing 26 coupled to intake duct 20 and recirculation duct 22. Filter housing 26 receives a filter element 28 configured to remove particulates from both air entering filter housing 26 via intake duct 20 and air entering filter housing 26 via recirculation duct 22. As explained in more detail below, air flows through exemplary filter element 28 by entering via intake duct 20 and recirculation duct 22, and exits via at least one of a first end 30 and a second end 32 of filter element 28.

Figure 2:
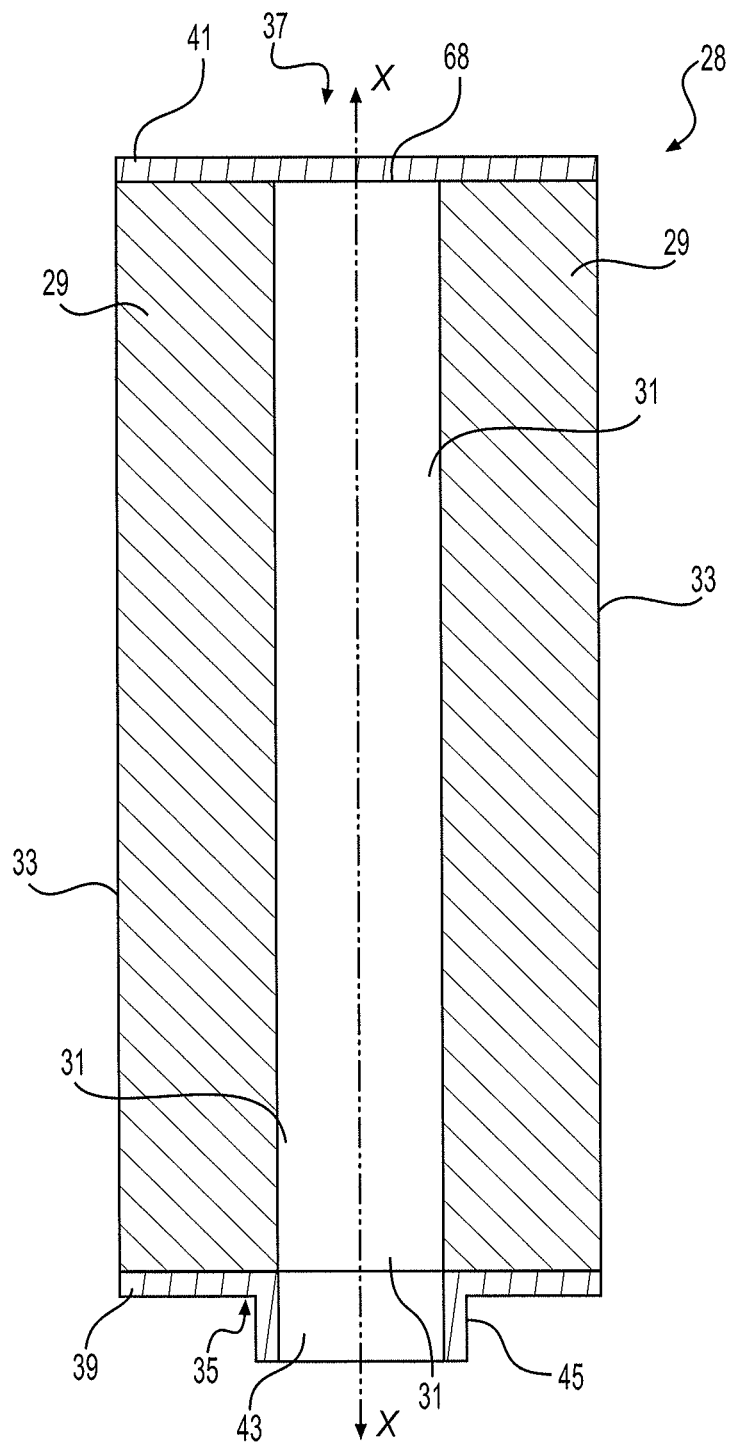
FIG. 2 is a schematic section view of an exemplary embodiment of a filter element.

As shown in FIG. 2, exemplary filter element 28 includes filter media 29 having a hollow passage 31 extending along a longitudinal axis X and an exterior surface 33 extending between a first end 35 and an opposite second end 37 of filter media 29. Filter media 29 may be configured such that air may be filtered and flow through filter media 29. Filter element 28 also includes a first fin 44 associated with and extending substantially radially relative to exterior surface 33 of filter media 29 (see, e.g., FIG. 1, which shows a different embodiment of filter element 28 than FIG. 2, but which shows an exemplary embodiment of first fin 44). Exemplary first fin 44 extends longitudinally at least partially (e.g., completely) between first end 35 and second end 37 of filter media 29. Exemplary filter element 28 also includes a second fin 46 associated with and extending substantially radially relative to exterior surface 33 of filter media 29 (see, e.g., FIG. 1, which shows a different embodiment of filter element 28 than FIG. 2, but which shows an exemplary embodiment of second fin 46). Exemplary second fin 46 extends longitudinally at least partially (e.g., completely) between first end 35 and second end 37 of filter media 29.

In the exemplary embodiment shown in FIG. 2, exemplary filter media 29 extends substantially (e.g., completely) around hollow passage 31. Exemplary filter media 29 includes a first filtration zone 50 extending between first fin 44 and second fin 46. Exemplary first filtration zone 50 is associated with a first portion of filter media 29, for example, such that first filtration zone 50 filters air received from intake duct 20. Thus, in the exemplary embodiment shown, first filtration zone 50 is configured to filter air received from surroundings 16 via intake duct 20. Exemplary filter element 28 also includes a second filtration zone 54 extending between first fin 44 and second fin 46. Exemplary second filtration zone 54 is associated with a second portion 56 of filter media 29, for example, such that second filtration zone 54 filters air received from recirculation duct 22. Thus, in the exemplary embodiment shown, second filtration zone 54 is configured to filter air received from interior 14 of cab 10 via recirculation duct 22. Exemplary filter media 29 may include any filter media type known to those skilled in the art, such as, for example, foam-type, screen-type, paper-type (e.g., pleated or folded filter paper-type), and combinations thereof.

According to some embodiments, first fin 44 and/or second fin 46 may be formed from material forming at least a portion of filter media 29. For example, filter media 29 may be formed from pleated filter paper, and one or more of fins 44 and 46 may be formed by hardening one or more adjacent pleats, for example, via impregnation with an adhesive or hardening agent. The hardened pleats may be formed to extend from an exterior surface of the remainder of filter element 29 and engage filter housing 26, for example, as described in more detail below. Alternatively, one or more of fins 44 and 46 may be formed from a material distinct from the material forming filter media 29. For example, one or more of fins 44 and 46 may be formed from a material such as plastic or metal and may be adhesively secured to exterior surface 33 of filter media 29.

Figure 3:
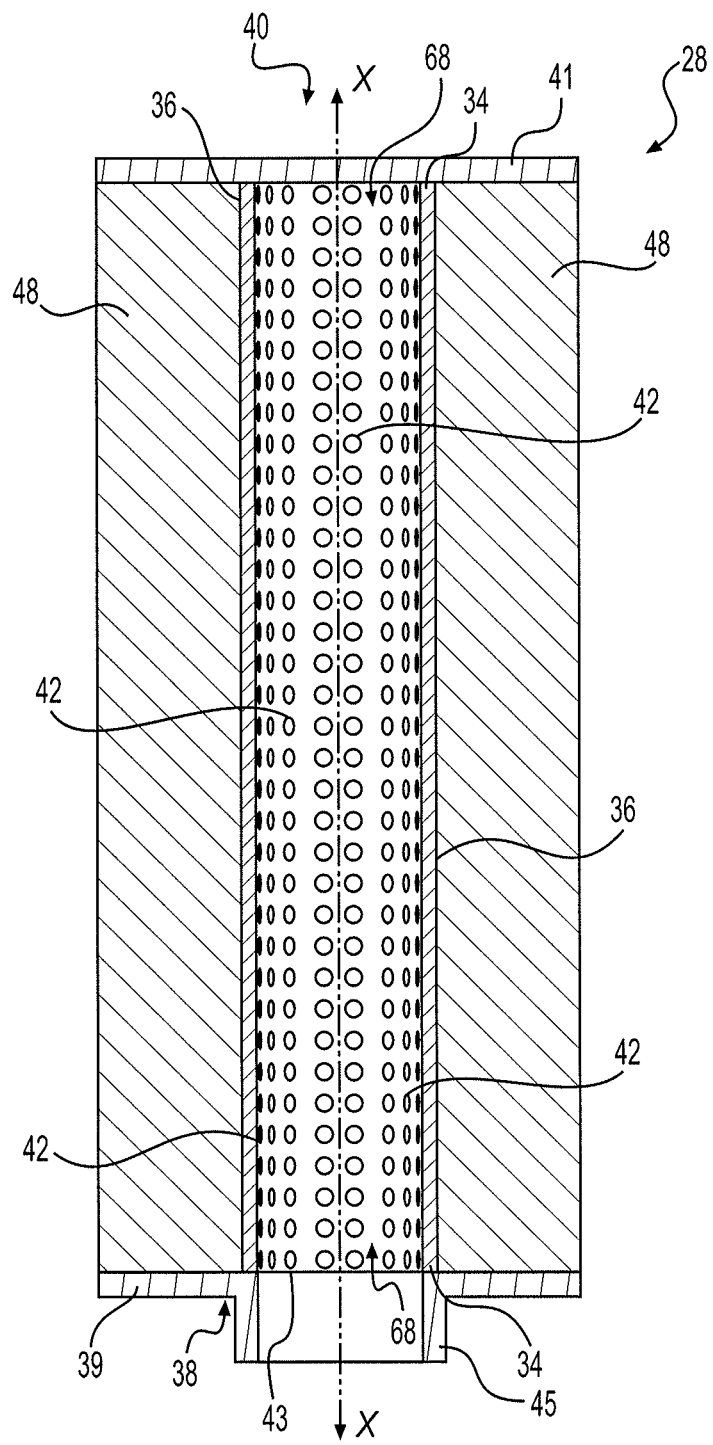
FIG. 3 is a schematic section view of the exemplary embodiment of filter element shown in FIG. 1.

As shown in FIGS. 2 and 3, filter element 28 may include a first end plate 39 coupled to the first end of the filter media and a second end plate 41 coupled to the second end of the filter media. According to some embodiments, first end plate 39 may include an opening 43 for providing flow communication between hollow passage 31 and HVAC system 18, as shown in FIG. 2. according to some embodiments, first end plate 39 may include a tubular portion 45 at least partially surrounding opening 43, for example, to provide an interface with HVAC system 18. According to some embodiments, second end plate 41 may provide a block to hollow passage 31. According to some embodiments, second end plate 41 may be configured substantially the same as first end plate 39, for example, having an opening and/or a tubular portion similar to first end plate 39. According to some embodiments, first fin 44 and/or second fin 46 may extend between and be operably coupled to one or more of first and second end plates 39 and 41.

In the exemplary configuration described above, filter housing 26 and filter element 28 are configured such that air entering filter housing 26 via intake duct 20 passes through first filtration zone 50 of filter media 48 and into hollow passage 31 of filter media 29. In addition, air entering filter housing 26 via recirculation duct 22 passes through second filtration zone 54 and into hollow passage 31. Thereafter, air in hollow passage 31 of filter media 29 exits filter element 28 via at least one of first end 35 and second end 37 of filter media 29 in a longitudinal direction substantially aligned with longitudinal axis X.

In the exemplary embodiment shown in FIG. 2, filter media 29 has a cross-section perpendicular to longitudinal axis X that is substantially circular. Other cross-sectional configurations are contemplated. For example, the cross-section may be oval-shaped or polygonal-shaped (e.g., substantially rectangular, square, or octagonal). According to some embodiments, the cross-section shape may change along the length of filter media 29. This may serve to accommodate desired air flow characteristics and/or packaging.

According to the exemplary embodiment shown in FIG. 3 (and also in FIG. 1), exemplary filter element 28 includes a tubular member 34 having a longitudinal axis X and an exterior surface 36 extending between a first end 38 and an opposite second end 40. Exemplary tubular member 34 includes a plurality of apertures 42 between first end 38 and second end 40, through which air may flow. Filter element 28 also includes first fin 44 associated with and extending from exterior surface 36 of tubular member 34. Exemplary first fin 44 extends longitudinally at least partially (e.g., completely) between first end 38 and second end 40 of tubular member 34. Filter element 28 also includes second fin 46 associated with and extending longitudinally from exterior surface 36 of tubular member 34. Exemplary second fin 46 extends longitudinally at least partially (e.g., completely) between first end 38 and second end 40 of tubular member 34.

As shown in FIGS. 1 and 3, exemplary filter element 28 also includes filter media 48 associated with exterior surface 36 of tubular member 34 and extending substantially (e.g., completely) around exterior surface 36 of tubular member 34 and between first fin 44 and second fin 46. Exemplary filter media 48 includes a first filtration zone 50 extending between first fin 44 and second fin 46. Exemplary first filtration zone 50 is associated with a first portion 52 of exterior surface 36 of tubular member 34, for example, such that first filtration zone 50 filters air received from intake duct 20. Thus, in the exemplary embodiment shown, first filtration zone 50 is configured to filter air received from surroundings 16 via intake duct 20. Exemplary filter element 28 also includes a second filtration zone 54 extending between first fin 44 and second fin 46, and substantially opposite first filtration zone 50. Exemplary second filtration zone 54 is associated with a second portion 56 of exterior surface 36 of tubular member 34, for example, such that second filtration zone 54 filters air received from recirculation duct 22. Thus, in the exemplary embodiment shown, second filtration zone 54 is configured to filter air received from interior 14 of cab 10 via recirculation duct 22. Exemplary filter media 48 may include any filter media type known to those skilled in the art, such as, for example, foam-type, screen-type, paper-type (e.g., pleated or folded filter paper-type), and combinations thereof.

In the exemplary embodiment shown in FIG. 1, filter housing 26 includes an interior surface 58 having a first receiver 60 configured to receive a remote end of first fin 44 of filter element 28 and a second receiver 62 configured to receive a remote end of second fin 46 of filter element 28. In this exemplary configuration, filter element 28 may slide longitudinally into filter housing 26, such that first 44 is received in first receiver 60 and second fin 46 is received in second receiver 62. For example, first receiver 60 and/or second receiver 62 may be grooves extending at least partially (e.g., completely) between first end 30 and second end 32 of filter element 28. Other securing structures are contemplated.

According to some embodiments, first and second fins 44 and 46 may serve to prevent air entering filter housing 26 via intake duct 20 and recirculation duct 22 from avoiding filtration from respective first filtration zone 50 and second filtration zone 54, as intended. This may be desirable for tailoring the filtration characteristics associated with air received from different sources. For example, air entering filter assembly 26 via intake duct 20 is received from surroundings 16 outside cab 10. Such air may include relatively more particulates than air received via recirculation duct 22 from interior 14 of cab 10. Thus, it may be desirable to expose air received from intake duct 20 to a greater surface area of filter media 48 to permit increased filtration, or conversely, it may be desirable to expose air received from recirculation duct 22 to a relatively reduced surface area of filter media 48. Thus, according to some embodiments, first and second fins 44 and 46 may serve to define first filtration zone 50 and second filtration zone 54 in a manner that tailors those zones to desired filtration levels. This may result in more efficient use of filter media 29, 48.

In the exemplary embodiments shown, filter element 28 includes a first seal element 64 associated with a remote end of first fin 44 configured to provide an air seal between first fin 44 and first receiver 60. Similarly, filter element 28 may also include a second seal element 66 associated with a remote end of second fin 46 configured to provide an air seal between second fin 46 and second receiver 62. First and second seal elements 64 and 66 may include a bead or layer of rubber-like or urethane-like material coupled to respective remote ends of first fin 44 and second fin 46, although alternative types of sealing structures are contemplated. For example, seal elements 64 and 66 may each be a strip of reticulated foam adhered to a remote end or edge of each of seal elements 64 and 66. Alternatively, or in addition, first and second seal elements 64 and 66 may be coupled to (e.g., received in) first and second receivers 60 and 62 independent of first and second fins 44 and 46.

In the exemplary configuration described above with respect to FIGS. 1 and 3, filter housing 26 and filter element 28 are configured such that air entering filter housing 26 via intake duct 20 passes through first filtration zone 50 of filter media 48, through a first portion of the plurality of apertures 42 in tubular member 34, and into an interior 68 of tubular member 34. In addition, air entering filter housing 26 via recirculation duct 22 passes through second filtration zone 54, through a second portion of the plurality of apertures 42 in tubular member 34, and into interior 68 of tubular member 34. Thereafter, air in interior 68 of tubular member 34 exits filter element 28 via at least one of first end 38 and second end 40 of tubular member 34 in a longitudinal direction substantially aligned with longitudinal axis X.

In the exemplary embodiment shown in FIGS. 1 and 3, tubular member 34 has a cross-section perpendicular to longitudinal axis X that is substantially circular. Other cross-sectional configurations are contemplated. For example, the cross-section may be oval-shaped or polygonal-shaped (e.g., substantially rectangular, square, or octagonal). According to some embodiments, the cross-section shape may change along the length of tubular member 34. This may serve to accommodate desired air flow characteristics and/or packaging.

In the exemplary embodiment shown in FIGS. 1 and 3, apertures 42 have substantially the same size and shape. According to some embodiments, at least some of apertures 42 may have at least one of a different size and a different shape than others of apertures 42. The selection of the size and shape of the apertures may be tailored to considerations, such as, for example, desired air flow through filter element 28 and/or manufacturing advantages. According to some embodiments, apertures 42 may be, for example, perforated holes, square holes in a grid pattern, and/or hexagonal holes in a honeycomb pattern.

In some embodiments, such as those shown in FIGS. 1-3, exemplary first fin 44 extends away from exterior surface of tubular member 34 or filter media 29 in a first direction, and exemplary second fin 46 extends away from exterior surface of tubular member 34 or filter media 29 in a second direction, thereby defining an angle α between the first direction and the second direction. Angle α may range from about 10 degrees to about 360 degrees, such as for example, between about 10 degrees and 180 degrees. According to some embodiments, angle α may be 20 degrees, 30 degrees, 40 degrees, 50 degrees, 60 degrees, 70 degrees, 80 degrees, and 90 degrees. Other angles are contemplated. The angle may be selected based on, for example, desired differences in the amount of filtration or air flow associated with first filtration zone 50 and second filtration zone 54.

In the exemplary embodiments shown, first fin 44 and second fin 46 are each substantially planar. According to some embodiments, one or more of first fin 44 and second fin 46 may have a cross-section perpendicular to longitudinal axis X that is curved. The configuration of first fin 44 and/or second fin 46 may be selected based on, for example, desired air flow through filter element 28. According to some embodiments, at least one of first fin 44 and second fin 46 may be formed integrally as a single piece with tubular member 34.

According to some embodiments, the filter media of first filtration zone 50 and the filter media of second filtration 54 zone have the same filtering characteristics. According to some embodiments, the filter media of first filtration zone 50 and the filter media of second filtration zone 54 have different filtering characteristics. According to some embodiments, first filtration zone 50 and second filtration zone 54 have the same filtration capacities. According to some embodiments, first filtration zone 50 and second filtration zone 54 have different filtration capacities.

INDUSTRIAL APPLICABILITY

The filter element and filter assembly disclosed herein may be used in machines, for example, to filter air conditioned by an HVAC system of an operator cab. For example, such an HVAC system may be configured to both draw air into cab 10 from surroundings outside the cab into the interior of the cab, and recirculate air within the cab for additional adjustment of the temperature or humidity of the air inside the cab.

According to some embodiments, filter element 28 may have two filtration zones, with each filtration zone being configured to remove particulate matter from air received from two different sources of an HVAC system. For example, first filtration zone 50 may be configured to remove particulate matter from air entering HVAC system 18 from surroundings 16 outside cab 10. Air may enter HVAC system 18 via intake duct 20 in flow communication with surroundings 16 and enter filter housing 26. Upon entering filter housing 26, air may pass through first filtration zone 50 of filter media 48 and enter either hollow portion 31 or interior 68 of tubular member 42, depending on the configuration of filter element. Thereafter, the filtered air may exit hollow passage 31 or tubular member 34 via one or more of first end and second end thereof in a direction substantially parallel to longitudinal axis X. In addition, second filtration zone 54 may be configured to remove particulate matter from recirculated air entering HVAC system 18 from inside cab 10 for additional conditioning. In particular, air may enter HVAC system 18 via recirculation duct 22 in flow communication with interior 14 of cab 10 and enter filter housing 26. Upon entering filter housing 26, air may pass through second filtration zone 54 of filter media 48 and enter either hollow passage 31 or interior 68 of tubular member 34. Thereafter, the filtered air may exit hollow portion 31 or tubular member 34 via one of more of first end and second end thereof in a direction substantially parallel to longitudinal axis X.

Thus, air received from both outside and inside cab 10 may be filtered by a single filter element and a single filter assembly. In this exemplary manner, separate filter assemblies and associated ducting for air drawn into the cab and air recirculated within the cab may be eliminated, thereby potentially reducing the space occupied by such assemblies. In addition, according to some embodiments, the number of parts in the machine may be reduced, thereby potentially reducing manufacturing and maintenance costs.

It will be apparent to those skilled in the art that various modifications and variations can be made to the exemplary disclosed filter element and filter assembly. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A filter element comprising:
   filter media having an elongated hollow passage extending along a longitudinal axis and extending between a first end and a second end, the filter media having an exterior surface;
   a first fin associated with and extending radially from the exterior surface of the filter media, the first fin extending longitudinally at least partially between the first end and the second end of the filter media; and
   a second fin associated with and extending radially from the exterior surface of the filter media, the second fin extending longitudinally at least partially between the first end and the second end of the filter media,
   wherein the filter media includes a first filtration zone extending partially around the hollow passage and between the first fin and the second fin, the first filtration zone being associated with a first portion of the filter media, and
   wherein the filter media includes a second filtration zone extending partially around the hollow passage and between the first fin and the second fin, the second filtration zone being associated with a second portion of the filter media.

2. The filter element of claim 1, wherein the filter media has a cross-section perpendicular to the longitudinal axis of the filter media, and wherein the cross-section of the filter media is at least one of circular, oval-shaped, and polygonal-shaped.

3. The filter element of claim 1, wherein the first fin extends away from the exterior surface of the filter media in a first direction, and the second fin extends away from the exterior surface of the filter media in a second direction, and an angle between the first direction and the second direction ranges from 10 degrees to 180 degrees.

4. The filter element of claim 1, wherein at least one of the first and second fins is substantially planar.

5. The filter element of claim 1, further including a seal element associated with a remote end of at least one of the first and second fins.

6. The filter element of claim 1, wherein the filter media of the first filtration zone and the filter media of the second filtration zone have the same filtering characteristics.

7. The filter element of claim 1, wherein the filter media of the first filtration zone and the filter media of the second filtration zone have different filtering characteristics.

8. The filter element of claim 1, wherein the first filtration zone and the second filtration zone have different filtration capacities.

9. The filter element of claim 1, further including a tubular member received in the hollow passage, the tubular member having a longitudinal axis and an exterior surface extending between a first end and a second end of the tubular member, wherein the tubular member includes a plurality of apertures between the first and second ends of the tubular member.

10. The filter element of claim 9, wherein the filter media is associated with the exterior surface of the tubular member and extends around the exterior surface of the tubular member and between the first fin and the second fin.

11. The filter element of claim 10, wherein the first filtration zone extends partially around the exterior surface of the tubular member and is associated with the first portion of the filter media, and wherein the second filtration zone extends partially around the exterior surface of the tubular member and is associated with the second portion of the filter media.

12. The filter element of claim 9, wherein the plurality of apertures have the same size and same shape.

13. The filter element of claim 9, wherein at least some of the plurality of apertures have at least one of a different size and a different shape than others of the plurality of apertures.

14. A filter assembly comprising:
a housing configured to be coupled to an intake duct and a recirculation duct; and
a filter element received in the housing, the filter element including:
filter media having an elongated hollow passage extending along a longitudinal axis and extending between a first end and a second end, the filter media having an exterior surface,
a first fin associated with and extending radially from the exterior surface of the filter media, the first fin extending longitudinally at least partially between the first end and the second end of the filter media, and
a second fin associated with and extending radially from the exterior surface of the filter media, the second fin extending longitudinally at least partially between the first end and the second end of the filter media,
wherein the filter media includes a first filtration zone extending partially around the hollow passage and between the first fin and the second fin, the first filtration zone being associated with a first portion of the filter media, and
wherein the filter media includes a second filtration zone extending partially around the hollow passage and between the first fin and the second fin, the second filtration zone being associated with a second portion of the filter media,
wherein the first filtration zone is configured to filter air received from the intake duct, and the second filtration zone is configured to filter air received from the recirculation duct.

15. The filter assembly of claim 14, wherein the housing includes an interior surface having a first receiver and a second receiver, wherein the first receiver receives the first fin, and the second receiver receives the second fin.

16. The filter assembly of claim 15, wherein the filter element further includes a first seal element associated with a remote end of the first fin, and a second seal element associated with a remote end of the second fin, and wherein the first and second seal elements provide respective air seals between the first fin and the first receiver and the second fin and the second receiver.

17. The filter assembly of claim 14, wherein the housing and the filter element are configured such that air entering the housing via the intake duct passes through the first filtration zone and into the hollow passage of the filter media, and such that air entering the housing via the recirculation duct passes through the second filtration zone and into the hollow passage of the filter media.

18. The filter assembly of claim 17, wherein air in the hollow passage of the filter media exits via at least one of the first end and the second end of the filter media.

19. The filter assembly of claim 14, wherein the first fin extends away from the exterior surface of the filter media in a first direction, and the second fin extends away from the exterior surface of the filter media in a second direction, and an angle between the first direction and the second direction ranges from 10 degrees to 180 degrees.

20. The filter assembly of claim 14, wherein the first filtration zone and the second filtration zone have different filtration capacities.

* * * * *